(12) United States Patent
Bruce et al.

(10) Patent No.: US 12,481,172 B2
(45) Date of Patent: Nov. 25, 2025

(54) CONTACT LENS MEMBRANE AND RELATED METHODS

(71) Applicant: CooperVision International Limited, Fareham (GB)

(72) Inventors: Ian Bruce, Southampton (GB); Robert Oag, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 311 days.

(21) Appl. No.: 18/025,654

(22) PCT Filed: Oct. 7, 2021

(86) PCT No.: PCT/GB2021/052605
§ 371 (c)(1),
(2) Date: Mar. 10, 2023

(87) PCT Pub. No.: WO2022/079416
PCT Pub. Date: Apr. 21, 2022

(65) Prior Publication Data
US 2023/0341707 A1    Oct. 26, 2023

Related U.S. Application Data

(60) Provisional application No. 63/090,741, filed on Oct. 13, 2020.

(51) Int. Cl.
*G02C 7/04*     (2006.01)
*B29D 11/00*    (2006.01)
*G02B 1/04*     (2006.01)

(52) U.S. Cl.
CPC .......... *G02C 7/04* (2013.01); *B29D 11/00038* (2013.01); *G02B 1/043* (2013.01)

(58) Field of Classification Search
CPC ..... G02C 7/04; B29D 11/00038; G02B 1/043
(Continued)

(56) References Cited

U.S. PATENT DOCUMENTS 5,443,506 A * 8/1995 Garabet ................ A61F 2/1648
                                                    623/6.37
9,789,655 B1   10/2017 Weibel et al.
(Continued)

OTHER PUBLICATIONS

International Search Report and Written Opinion issued in corresponding International Patent Application No. PCT/ GB2021/052605 dated Jan. 24, 2022 (11 pages).
(Continued)

*Primary Examiner* — James R Greece
(74) *Attorney, Agent, or Firm* — Kilyk & Bowersox, P.L.L.C.

(57) ABSTRACT

The present disclosure relates to a membrane (140) suitable for forming at least part of a contact lens (500) by bonding to a bulk lens portion (540). The membrane has a central axis (168). The membrane comprises: a first face (142); a second face (144); and a peripheral edge (160). In a cross-sectional plane passing through and parallel to the central axis of the membrane, the thickness (148) of the membrane is at least 10 microns at a distance of 60 microns from the peripheral edge. The present disclosure also relates to a contact lens (500). The contact lens comprises a membrane (140), a bulk lens portion (540), and a bonding interface (510) between at
(Continued)

least part of the membrane and at least part of the bulk lens portion. The present disclosure also relates to a method of manufacturing a contact lens.

11 Claims, 3 Drawing Sheets

(58) Field of Classification Search
USPC .................................................. 351/159.02
See application file for complete search history.

(56) References Cited

U.S. PATENT DOCUMENTS

| | | |
|---|---|---|
| 2007/0291224 A1 | 12/2007 | Lai |
| 2010/0208194 A1* | 8/2010 | Gupta ................ G02B 3/02 359/666 |
| 2012/0140167 A1* | 6/2012 | Blum ................ G02C 7/04 351/159.73 |
| 2014/0227437 A1* | 8/2014 | DeBoer ........... B29D 11/00009 427/162 |
| 2014/0253870 A1* | 9/2014 | Jiang ................ G02C 7/085 359/666 |
| 2015/0362754 A1 | 12/2015 | Etzkorn et al. |
| 2016/0109726 A1* | 4/2016 | Tai ................ G02C 7/049 351/159.04 |
| 2016/0377887 A1 | 12/2016 | Waite et al. |
| 2018/0011341 A1 | 1/2018 | Juan, Jr. et al. |
| 2019/0121161 A1 | 4/2019 | Peng et al. |

OTHER PUBLICATIONS

International Preliminary Report On Patentability issued in corresponding International Patent Application No. PCT/GB2021/052605 dated Jan. 26, 2023 (with copy of Article 34 claims) (20 pages).
Demand under Article 31 in corresponding International Patent Application No. PCT/GB2021/052605 dated Aug. 11, 2022 (19 pages).
2nd Written Opinion (of the IPEA) issued in corresponding International Patent Application No. PCT/GB2021/052605 dated Sep. 20, 2022 (6 pages).
Response to 2nd Written Opinion in corresponding International Patent Application No. PCT/GB2021/052605 dated Nov. 18, 2022 (12 pages).
Office Action issued in corresponding European Patent Application 21798088.7 dated Sep. 23, 2025 (5 pages).

* cited by examiner

CONTACT LENS MEMBRANE AND RELATED METHODS

This application is a National Stage Application of PCT/GB2021/052605, filed Oct. 7, 2021, which claims priority to U.S. Provisional Patent Application No. 63/090,741 filed Oct. 13, 2020.

FIELD

The present disclosure concerns a membrane for forming at least part of a contact lens. The present disclosure also concerns a method of manufacturing a contact lens.

BACKGROUND

Contact lenses for correcting presbyopia are known. In one approach, each contact lens of a contact lens pair has a different optical power. For example, the contact lens in the right eye might have a power for near vision, and the contact lens in the left eye might have a power for distance vision. This is termed 'monovision', as the wearer of this type of contact lens no longer has binocular vision, which can be a problem.

In another approach, each contact lens of the pair has a central optical zone having regions with different optical powers. For example, the centre of the optical zone may have a power for near vision, and a ring-shaped region around the centre may have a power for distance vision (or vice versa). In some variants of this approach there is more than one zone of each power. Some users complain of problems including ghosting when using contact lenses of this kind.

To overcome these issues, contact lenses have been proposed that have a central region that is inflatable with fluid. Inflating/deflating the central region changes the curvature of the lens and therefore its focal length, and hence power, also changes. Such contact lenses may be referred to as variable power contact lenses.

The manufacture of these 'variable power' contact lenses can involve the creation of two parts of the contact lens: a base portion (that is intended to be in contact with the surface of an eye in the case of contact lenses), and an upper lens portion, also referred to as a membrane. By securing these two portions together, a cavity is created therebetween, which can be filled with fluid. In some instances, the fluid that fills the cavity is a refractive-index changing liquid. Sometimes, the fluid that is used is a liquid crystal that is capable of changing its refractive index.

One of the problems associated with the creation of a lens of that type is that the upper lens portion is prone to folding and nicking towards its periphery, which can lead to detachment of the upper lens portion from the base portion. FIGS. 1 and 2 illustrate nicking and wrinkling on the surface of a contact lens.

FIG. 1 is a sectional side view of a contact lens 10. The upper lens portion 14 is connected to the base portion 12 to form the contact lens 10. The thin, peripheral edge part 16 of the upper lens portion 14 has nicked and folded, and has become detached from the base portion 12.

FIG. 2 shows a plan view of the contact lens 10. An enlarged view of a portion 10' of the contact lens 10 is also shown in FIG. 2. The contact lens 10 has a central optical zone 18 that is arranged to be positioned over the pupil of an eye when the contact lens is in use. The upper lens portion 14 has formed wrinkles 20 when the upper lens portion 14 was attached to the base portion 12. In the enlarged portion 10', the wrinkles 20' are more clearly shown on the upper lens portion 14'.

The presence of nicking, wrinkles, and folding in the upper lens portion is undesirable, as it renders the lens unusable.

The present disclosure seeks to mitigate the above-mentioned problems. Alternatively or additionally, the present disclosure seeks to provide an improved contact lens.

SUMMARY

The present disclosure provides according to a first aspect, a membrane for forming at least part of a contact lens, as claimed and described herein.

According to a second aspect of the present disclosure, there is also provided a contact lens as claimed and described herein.

According to a third aspect of the present disclosure, there is also provided a method of manufacturing a contact lens as claimed and described herein.

According to a fourth aspect of the present disclosure, there is also provided a contact lens made by the method of the third aspect as claimed and described herein.

Optional but preferred features are set out herein.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DESCRIPTION OF THE DRAWINGS

Embodiments of the present disclosure will now be described by way of example only with reference to the accompanying schematic drawings of which.

DETAILED DESCRIPTION

Figure 1:
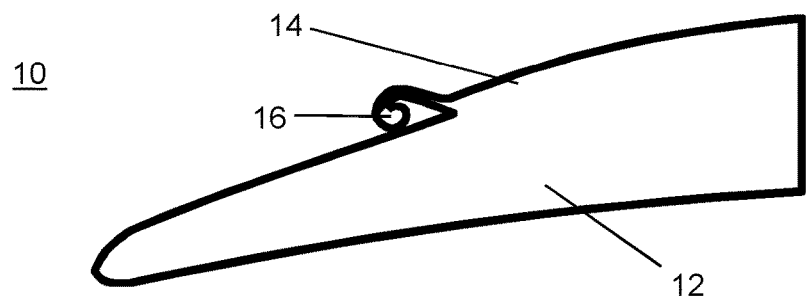
FIG. 1 is a cross-sectional side view of a part of a contact lens.
Figure 2:
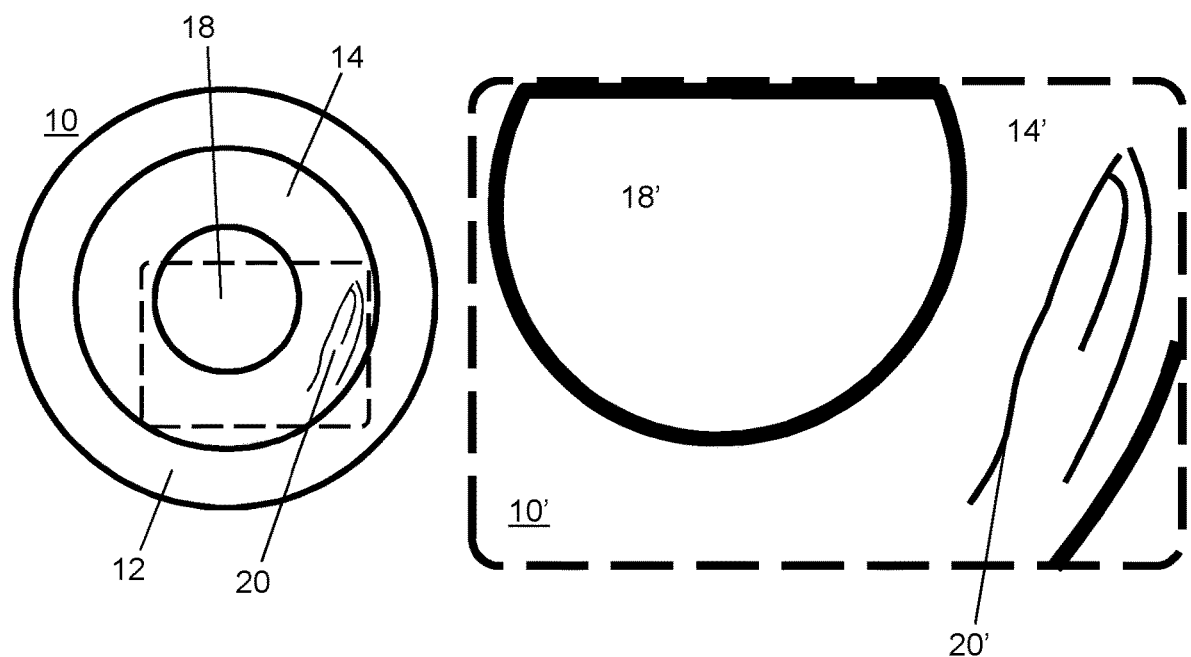
FIG. 2 is a plan view of a contact lens.

The present disclosure will be more fully understood and further advantages will become apparent when reference is made to the following detailed description of embodiments of the present disclosure. (Note that the figures are not to scale.)

In the following description, the terms "membrane" and "bulk lens portion" refer to portions that form at least part of a contact lens. Optionally, the membrane itself is not a lens, i.e. the power of the membrane may be zero or substantially zero. Optionally the bulk lens portion itself is not a lens, i.e. the power of the bulk lens portion may be zero or substantially zero. The bulk lens portion refers to the portion of the contact lens that is in contact with an eyeball when the contact lens is in use. The membrane refers to the portion that makes up the lens which is not in contact with the eyeball, and which forms part of the external curvature of the contact lens when the contact lens is in use on an eyeball.

As set out above, the first aspect of the present disclosure provides according to a first aspect a membrane for forming at least part of a contact lens. The membrane is suitable for forming at least part of a contact lens by bonding to a bulk lens portion. The membrane has a central axis. The membrane comprises a first face and a second face. The membrane further comprises a peripheral edge. In a cross-sectional plane passing through and parallel to the central axis of the membrane, the thickness of the membrane is at least 10 microns at a distance of 60 microns from the peripheral edge (e.g., 10 microns to 50 microns or more).

The measurement of the distance from the peripheral edge may be along a measurement line orthogonal to a tangent of the peripheral edge, the line extending and passing through the central axis. The measurement line may be orthogonal to a plane that is tangential to the peripheral edge. The measurement of the distance from the peripheral edge may be along a line orthogonal to the central axis, the line extending and passing through a part of the peripheral edge. The part of the peripheral edge that the measurement line passes through may be the part of the peripheral edge that is located furthest from the central axis. The part of the peripheral edge that the measurement line passes through may be the part of the peripheral edge that has the lowest radius of curvature. The part of the peripheral edge that has the lowest radius of curvature may be the part of the peripheral edge that is located furthest from the central axis. The distance measured in accordance with each of these options for the definition of the measurement line may be substantially the same.

The first and second faces may be connected by the peripheral edge. Substantially the entire perimeter of the first face may be connected to substantially the entire perimeter of the second face by the peripheral edge. In this way, the membrane may have two faces, each face connected by their respective peripheral edges (perimeters), and each face facing in substantially the opposite directions to each other.

The membrane is suitable for bonding to a bulk lens portion in order to form at least part of a contact lens. One of the first face or the second face, or both the first face and the second face, may be suitable for adhering to an adhesive, which may also adhere to a surface of a bulk lens portion. One of the first face or the second face, or both the first face and the second face, may be suitable for plasma treatment. To be suitable for plasma treatment, the material that is comprised in either the first face or the second face, or both the first face and the second face, may be such that it is able to bond to the bulk lens portion (or the membrane) after application of the plasma treatment. The chosen material may be configured such that after being cleaned and treated with plasma, reactive species are formed on the plasma treated surface, and these reactive species, when introduced to a surface of the bulk lens portion, react and form a chemical bond with the material of the surface of the bulk lens portion. This chemical bond may be referred to throughout the description of the present disclosure as a "plasma bond". The plasma bond may be a covalent bond.

The central axis of the membrane is located in the centre of the membrane when the membrane is viewed in plan view. For example, if the membrane is elliptical in shape when viewed in plan view, then the centre and the central axis of the membrane is located at the point exactly half-way between the two focal points of the ellipse. For example, if the membrane is a circle when viewed in plan view, then the centre and the central axis of the membrane is located at the centre of the circle. The central axis of the membrane may be located at the mid-point of the longest diameter of the membrane, when the membrane is viewed in plan view.

The thickness of the membrane may be measured along a line that is orthogonal to the measurement line for measuring distance from the peripheral edge. The thickness of the membrane may also be measured along a line that is parallel to the central axis.

Having a membrane with a thickness of at least 10 microns when measured at a distance of 60 microns from the peripheral edge results in a membrane that has more structural integrity than the membranes of the prior art. Membranes of the prior art taper to a thin point as they approach the peripheral edge of the membrane. Having a thickness of at least 10 microns when measured at a distance of 60 microns from the peripheral edge results in a membrane having a thicker and more rounded profile nearer the peripheral edge, compared with membranes that taper to a thin point. The inventors have found that the membrane has a reduced likelihood of nicking, wrinkling, or folding, as a result of the thicker membrane profile nearer the peripheral edge.

Additionally, having a membrane with a thickness of at least 10 microns when measured at a distance of 60 microns from the peripheral edge results in a membrane that has improved curing characteristics. The increased thickness of the membrane results in a lower surface area to volume of the membrane as compared to membranes that taper towards the peripheral edge. When certain materials are used for the formation of the membrane, there may be incomplete curing at the surface of the membrane. With thinner and tapered membranes, the tip of the peripheral edge of the lens can be lost during the curing process, with larger losses associated with shallower angles of the tapered design. The membrane of the present disclosure reduces these losses, at least in part due to the lower surface area to volume ratio. The membrane of the present disclosure may also reduce these losses at least in part due to a resulting large angle between the first and second face of the membrane at the peripheral edge.

The membrane may have a thickness of at least 10 microns when measured at a distance of 50 microns from the peripheral edge (e.g., 10 microns to 50 microns or more). The increased thickness nearer the peripheral edge may further reduce the likelihood of nicking, folding, and wrinkling of the membrane when it is bonded to the bulk lens portion. The membrane may have a thickness of at least 15 microns when measured at a distance of 60 microns from the peripheral edge. The membrane may have a thickness of at least 20, or at least 25, or at least 30 microns when measured at a distance of 60 microns from the peripheral edge. Again, the increased thickness may reduce the likelihood of nicking, folding, and wrinkling of the membrane when it is bonded to the bulk lens portion.

The circumferential edge, when viewed in the cross-sectional plane, may comprise a corner. The corner may represent a junction between at least two edges of a shape. The corner may represent a junction that is shared by the first face and the second face. The corner may have a radius of curvature of 1 micron or less. The membrane comprising a corner may result in a membrane that is simpler to manufacture, as it may not be necessary to smooth the peripheral edge into a smooth curve.

The peripheral edge, in the cross-sectional plane, may be a convex curve. It may be that no corners are comprised in the peripheral edge, when viewed in the cross-sectional plane. All of the peripheral edge, when viewed in the cross-sectional plane, may have a radius of curvature of greater than 1 micron. The absence of any corners on the peripheral edge of the membrane may result in better adhesion/bonding to the bulk lens portion.

The membrane may have an elliptical perimeter. In a plane orthogonal to the central axis, the membrane may have an elliptical perimeter. The membrane may be circular. The perimeter of the membrane may be circular. In a plane orthogonal to the central axis, the perimeter of the membrane may be circular.

The first face of the membrane may be flat or concave. The first face may be configured to complement the shape of a face of a bulk lens portion, so that the membrane can be bonded to the bulk lens portion.

The second face of the membrane may be convex. Having a convex shape may be to enable a cavity to be formed between the membrane and the bulk lens portion, when the membrane and the bulk lens portions are bonded together.

The present disclosure provides, according to a second aspect, a contact lens. The contact lens comprises a membrane according to the first aspect. The contact lens also comprises a bulk lens portion having a first face. The contact lens also comprises a bonding interface between at least part of the first face of the membrane and at least part of the first face of the bulk lens portion.

The bonding interface may comprise chemical bonding between the membrane and the bulk lens portion. The chemical bonding may comprise covalent bonding. The bonding interface may be formed by plasma treatment, resulting in a plasma bond. The bonding interface may comprise an adhesive layer, the adhesive layer being bonded to the at least part of the first face of the membrane and the at least part of the first face of the bulk lens portion.

The contact lens may be arranged such that, in use, the second face of the membrane faces away from an eye when the contact lens is arranged on the surface of the eye.

The bulk lens portion may have a second face, the second face may be concave in shape. The second face may be arranged to be positioned on the surface of an eye, when in use. The second face may be configured to be in contact with the surface of an eye, when in use. The concave shape of the second face of the bulk lens portion may enable a more comfortable fit of the contact lens on the eye, when in use, compared with an alternative shape such as a flat face.

The at least part of the first face of the membrane may comprise a region adjacent the peripheral edge of the membrane. The at least part of the first face of the membrane may comprises a region adjacent the peripheral edge of the membrane when the contact lens is viewed in plan view. Having the bonding interface at the perimeter of the membrane may prevent nicking and folding at the edge, when the membrane is bonded to the bulk lens layer.

This may be because the perimeter of the membrane (when the membrane is viewed in plan view) is the part of the membrane that is the most prone to nicking and folding, when the membrane is bonded to the bulk lens layer.

The first face of the membrane and the first face of the bulk lens portion may define a cavity within the lens. The cavity may be configured to be at least partially filled with liquid. The cavity may be configured to provide further optical properties to the contact lens. It may be that the membrane has substantially no optical power. It may be that the bulk lens portion has substantially no optical power. The fluid filled cavity may provide substantially all of the optical power. The volume of fluid in the cavity may be configured to be variable.

In some instances, the fluid that fills the cavity is a refractive-index changing liquid. The fluid, as an option, can be a liquid crystal that is capable of changing its refractive index. The fluid can be any conventional fluid used in cavities for contact lenses.

The first face of the membrane may be larger than the size of a pupil of an eye, when the contact lens is in use on the surface of the eye.

The bonding interface may comprise a plasma bond.

The present disclosure provides, according to a third aspect, a method of manufacturing a contact lens. The method comprises the step of forming a membrane according to the first aspect. The method also comprises the step of forming a bulk lens portion. The bulk lens portion has a first face and a second face. The method also comprises the step of bonding the first face of the membrane to the first face of the bulk lens portion.

The bonding may be plasma bonding. The step of bonding may comprise plasma treating the first face of the bulk lens portion. The step of bonding may comprise pressing the first face of the membrane to the first face of the bulk lens portion. The step of pressing the first face of the membrane to the first face of the bulk lens portion may take place after the step of plasma treating the first face of the bulk lens portion. The step of bonding may comprise plasma treating the first face of the membrane. The step of bonding may comprise plasma treating the first face of the membrane and the first face of the bulk lens portion.

The present disclosure provides, according to a fourth aspect, a contact lens made by the method of the third aspect.

It will of course be appreciated by the skilled person that features described in relation to one aspect of the present disclosure may be incorporated into other aspects of the present disclosure. For example, the contact lens of the present disclosure may incorporate any of the features described in reference to the membrane of the present disclosure, or the method of the present disclosure, and vice versa. The disclosure according to the third aspect may incorporate any of the features described in relation to the first or second aspect, and vice versa.

Figure 3A:
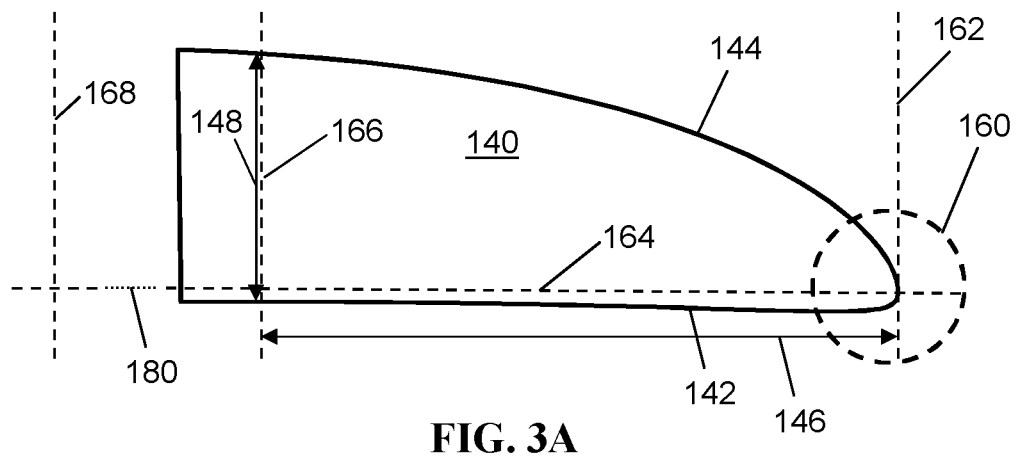
FIG. 3A is a cross-sectional side view of a part of a lens membrane according to a first embodiment of the present disclosure.

FIG. 3A shows a cross-sectional side view of a part of a membrane 140 according to an embodiment of the present disclosure. The membrane 140 has a first face 142 and a second face 144. The first face 142 and the second face 144 are connected by a peripheral edge 160. The region of the peripheral edge 160 is indicated with a circular dashed line. In plan view (not shown), the peripheral edge 160 extends around the perimeter of the membrane 140, linking the first face 142 to the second face 144.

Tangential line 162 is at a tangent to part of the peripheral edge 160. The tangential line 162 is at a tangent to the part of the peripheral edge 160 that is located furthest from the central axis 168. The part of the peripheral edge 160 that is located furthest from the central axis 168 also happens to have the smallest radius of curvature compared to the rest of the peripheral edge 160. The tangential line 162 is also parallel to the central axis 168, which passes through the centre of the membrane 140. (Dashed line 180 indicates that the central axis 168 is further away from the peripheral edge 160 than may be apparent in the figure: the part of the membrane 140 that is shown in FIG. 3A is only a small part of the whole membrane.)

The thickness measurement line 166 is on the measurement line 164, which connects the tangential line 162 to the central axis 168. The measurement line 164 is orthogonal to both the tangential line 162 and the central axis 168. The thickness measurement line 166 is also orthogonal to the measurement line 164. The central axis 168, the thickness measurement line 166, and the tangential line 162 are all parallel to each other.

The distance between the first face 142 and the second face 144 along the thickness measurement line 166 is the thickness of the membrane 148. The thickness of the membrane 148 is measured at a distance 146 from the peripheral edge 160, and more specifically from the tangential line 162. The distance 146 is 60 microns. The thickness 148 of the membrane 140 when measured at the distance 146 (of 60 microns from the peripheral edge 160) is greater than or equal to 10 microns.

In embodiments of the present disclosure, the thickness of the membrane when measured at a distance of 60 microns from the peripheral edge is, or is at least, 10 microns. The thickness of the membrane when measured at a distance of 60 microns from the peripheral edge may be, or may be at least 15 microns. The thickness of the membrane when measured at a distance of 60 microns from the peripheral edge may be, or may be at least 20 microns, or at least 25 microns, or at least 30 microns. The thickness of the membrane when measured at a distance of 50 microns from the peripheral edge may be, or maybe at least 10 microns.

The second face 144 of the membrane 140 has a convex curvature. The first face 142 has a slightly concave curvature. This is because when the membrane 140 is bonded to a bulk lens portion (not shown) to form a contact lens, it may need to be able to form a cavity between the bulk lens portion and the first face 142 of the membrane 140. Additionally, the curvature of the first face 142 of the membrane is concave because the membrane 140 is arranged to bond with a bulk lens portion (not shown) in order to form a contact lens, with the membrane 140 facing away from the eye.

Figure 3B:
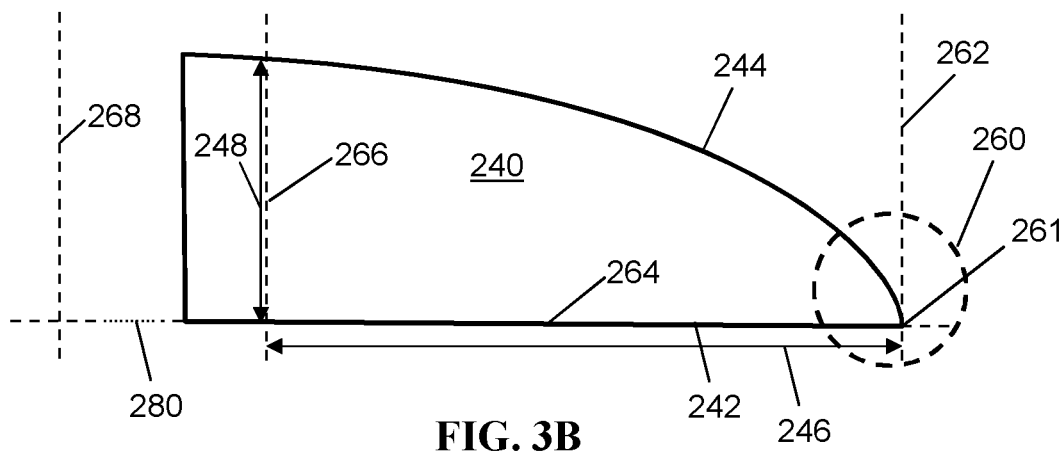
FIG. 3B is a cross-sectional side view of a part of a lens membrane according to a second embodiment of the present disclosure

FIG. 3B shows a cross-sectional side view of a part of a membrane 240 according to another embodiment of the present disclosure. The membrane 240 has a first face 242 and a second face 244. Like the embodiment of FIG. 3A, the first face 242 and the second face 244 of the embodiment of FIG. 3B are connected by a peripheral edge 260, which is indicated by a circular dashed line.

For conciseness, only the difference between FIG. 3B and FIG. 3A will be described.

The peripheral edge 260 comprises a corner 261. The corner 261 has a radius of curvature of less than 1 micron. In embodiments of the present disclosure, the corner may have a radius of curvature of substantially zero. A radius of curvature of substantially zero may be less than 0.1 microns. The corner 261 is the part of the peripheral edge 260 that is located furthest from the central axis 268. The thickness 248 of the membrane 240 is measured at a distance 246 of 60 microns from the corner 261 of the peripheral edge 260, along a measurement line 264 that is orthogonal to the central axis 268 and passes through the corner 261 of the peripheral edge 260.

Figure 4:
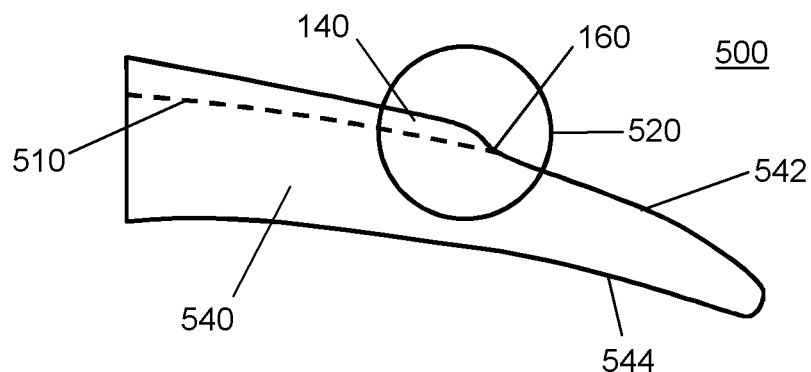
FIG. 4 is a cross-sectional side view of a part of a contact lens according to a third embodiment of the present disclosure.

FIG. 4 shows a cross-sectional side view of a part of a contact lens 500, according to an embodiment of the present disclosure.

The contact lens 500 comprises a bulk lens portion 540 and the membrane 140 of FIG. 3A. The contact lens 500 also comprises a bonding interface 510 between the membrane 140 and the bulk lens portion 540. The bonding interface is a plasma bond (the plasma bond being as described above). The bulk lens portion 540 has a first face 542 and a second face 544. A part of the first face 542 of the bulk lens portion 540 is bonded via the bonding interface 510 to a part of the first face 142 of the membrane 140.

As can be seen within the circled region 520 that encompasses the peripheral edge 160 of the membrane, the thickness of the membrane 140 has resulted in a smooth profile of the second face 144 of the membrane 140 as it joins the bulk lens portion 540 near the peripheral edge 160.

Figure 5:
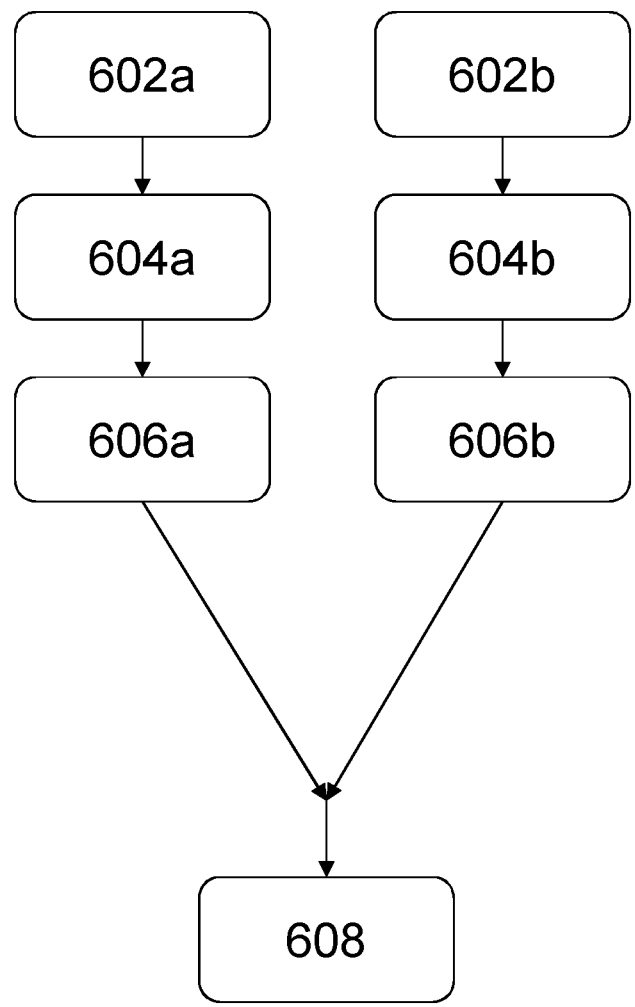
FIG. 5 is a flowchart of a method of manufacturing a contact lens according to an embodiment of the present disclosure.

The following is an exemplary method of manufacture of a contact lens, according to an embodiment of the present disclosure. FIG. 5 shows a flowchart of a method of manufacturing a contact lens according to an embodiment of the present disclosure.

The method comprises the step of forming a membrane. The membrane is formed of silicone hydrogel or silicone elastomer. The membrane is formed in a membrane molding assembly, which comprises a first mold part and a second mold part assembled together. The first and second mold parts are formed in mold part forming step 602a, using metal dies. A surface of each of a pair of metal dies corresponds to a surface of a mold part to be formed. (Considering that only one surface of the mold part to be formed is used in the formation of any of the contact lens components, the die used to form the other surface does not need to form a particular shape.) One of the dies may be flat, for example. The other die may have a concave cavity. This forms a mold part with a convex anterior surface and a flat rear surface. Mold part forming 602a includes holding the dies together and injection molding a first mold part. A similar second pair of dies are used to form a second mold part, also by injection molding. The second pair of dies may include a die with a convex protrusion, while the second die of the second pair may be flat. The mold part formed in this second pair of dies would therefore have a concave surface and a flat (rear) surface.

Mold part forming step 602b includes the formation of a pair of injection molded molds that are used to form a bulk lens portion. The steps for forming the pair of molds for forming the bulk lens portion are substantially the same as the steps for forming the pair of molds for forming the membrane (602a). The injection molded molds for forming the bulk lens portion may be a different shape to the mold for forming the membrane.

A dry membrane is then formed in membrane forming step 604a. A dry bulk lens portion is also then formed in step 604b. The steps for the formation of both the membrane and the bulk lens portion is substantially the same and is as follows. In the case of hydrogel members or silicone hydrogel members, the membrane (or bulk lens portion) can be made by polymerizing a hydrogel or silicone hydrogel lens formulation that includes a polymerization initiator in a membrane shaped cavity formed between the first mold part and the second mold part. For silicone elastomer members, the membrane can be made by curing, vulcanizing, or catalyzing, such as by hydrosylation, a liquid silicone elastomer material in a membrane shaped cavity formed between the first mold part and the second mold part. The surface of each mold part that forms the membrane shaped cavity may be convex, concave, planar or a combination of thereof. After formation of the membrane, the two mold parts are separated such that the membrane remains attached to the surface of one of the mold parts. As a result, a membrane is provided on a surface of the first or second mold part. In embodiments of the present disclosure, it is desirable to place the membrane on a surface of a mold part that was not used to produce the membrane, but that may require additional steps to achieve the desired alignment of the member to the mold part.

Washing steps 606a and 606b involve washing of the membrane and the bulk lens portion respectively. Any residue from the formation of the membrane and the bulk lens portion in the mold parts is washed off. Also, in this step, the washing causes the dry membrane and bulk lens portion to swell as water is retained within the structure of the membrane and the bulk lens portion.

The method further comprises bonding step 608. Bonding step 608 is the step of bonding the bulk lens portion to the membrane, to form a contact lens.

The membrane or bulk lens portion is provided on a compliant stage. The compliant stage may have a greater flexibility than the first and/or second mold parts. The provision of the membrane or the bulk lens portion on the compliant stage can be done manually, or it can be done using an automated machine, such as a robotic device. Optionally, each of the membrane and/or bulk lens portion is provided on a compliant stage.

The compliant stage provided as a support for the membrane and/or bulk lens portion may be of a material that is more pliable than the material of the first mold part and/or second mold part. Using a deformable material to form the compliant stage facilitates ensuring proper alignment and sufficient coupling of the second lens portion to the membrane. For example, the contact between the bulk lens portion and the membrane is more complete than when the membrane is provided on a rigid convex surface.

The bulk lens portion is provided on a convex surface. The membrane located on the compliant stage is placed in contact with the second lens portion. The placement of the membrane on the bulk lens portion is such that the second bulk portion is aligned with the membrane, and the compliant stage/stages provides compression to the second lens portion and/or membrane.

Once the bulk lens portion and the membrane are in contact, the methods of the present disclosure then include a step of bonding the bulk lens portion and the membrane to form the contact lens. The bonding can be achieved using an adhesive, or curing the components together, and the like. This bonding step of the method may include one or more of the following steps:

Modifying a surface of the membrane and or bulk lens portion, for example prior to bringing the membrane and bulk lens portion into contact;

Bonding the bulk lens portion to the membrane, for example by heating the bulk lens portion and the membrane while they are in contact;

Clamping the bulk lens portion and the membrane while they are in contact, for example before bonding;

According to embodiments of the present disclosure, the methods include a step of modifying a surface, e.g. a convex surface, of the bulk lens portion and/or modifying a surface, e.g. a concave surface, of the membrane by exposing the bulk lens portion and/or the membrane respectively to a plasma treatment process. In other words, the surfaces of the bulk lens portion and membrane can be activated by exposing them to plasma. After being exposed to plasma, when the membrane and the bulk lens portion are brought into contact, the contacting portions of the membrane and the bulk lens portion form a molecular bond due to the formation of reactive species resulting from the plasma treatment.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

Optionally the membrane is formed of silicone elastomer. The membrane may be formed of any other suitable membrane material, such as hydrogel, or rigid gas permeable membrane made from silicone acrylate or variants of such.

Optionally the bulk lens portions is formed of silicone elastomer. The bulk lens portion may be formed of any other suitable bulk lens portion material, such as hydrogel, or rigid gas permeable membrane made from silicone acrylate or variants of such. The membrane may be formed of a different material to the bulk lens portion.

Optionally, the membrane and the bulk lens portion are bonded by ultraviolet (UV) treatment. The UV treatment may comprise curing a material under the application of UV light. The cured material may be the membrane, or the bulk lens portion, or both the membrane and the bulk lens portion, or an adhesive that is in contact with a portion of the bulk lens portion and in contact with a portion of the membrane. The UV treatment may comprise activating a portion of the membrane or the bulk lens portion. The activated portion or portions may then be able to be brought into contact with each other to form a chemical bond.

Optionally, the membrane and the bulk lens portion are bonded by ozone treatment. The ozone treatment may comprise exposing a portion of the membrane or the bulk lens portion to ozone. The exposure to ozone may activate the portion of the membrane or the portion of the bulk lens portion. The activated portions may then be able to be brought into contact with each other to form a chemical bond. The bond may be a covalent bond.

Optionally, the membrane and the bulk lens portion are bonded by adhesion. The adhesion may be produced by use of an adhesive. The adhesive may be applied to a portion of the membrane, or a portion of the bulk lens portion, or both a portion of the membrane and a portion of the bulk lens portion. The application of the adhesive may be before the membrane and the bulk lens portion are brought into contact with each other as part of the bonding process.

The present disclosure can be further described in the following clauses:

Clause 1: A membrane for forming at least part of a contact lens by bonding to a bulk lens portion, the membrane having a central axis and comprising:
 a first face;
 a second face; and
 a peripheral edge;
 wherein, in a cross-sectional plane passing through and parallel to the central axis of the membrane, the thickness of the membrane is at least 10 microns at a distance of 60 microns from the peripheral edge.

Clause 2: The membrane of clause 1, wherein the thickness of the membrane is at least 10 microns when measured at a distance of 50 microns from the peripheral edge.

Clause 3: The membrane of clauses 1 or 2, wherein the thickness of the membrane is at least microns when measured at a distance of 60 microns from the peripheral edge.

Clause 4: The membrane of clause 3, wherein the thickness of the membrane is at least 30 microns when measured at a distance of 60 microns from the peripheral edge.

Clause 5: The membrane of clauses 1 to 4, wherein the circumferential edge, in the cross-sectional plane, comprises a corner having a radius of curvature of less than one micron.

Clause 6: The membrane of clauses 1 to 4, wherein the peripheral edge, in the cross-sectional plane, is a convex curve.

Clause 7: The membrane of clauses 1 to 6, wherein the membrane has an elliptical perimeter.

Clause 8: The membrane of clause 7, wherein membrane is circular.

Clause 9: The membrane of clauses 1 to 8, wherein the first face is flat or concave.

Clause 10: The membrane of clause 9, wherein the second face is convex.

Clause 11: A contact lens comprising:
   the membrane of clauses 1 to 10;
   a bulk lens portion having a first face; and
   a bonding interface between at least part of the first face of the membrane and at least part of the first face of the bulk lens portion Clause 12: The contact lens of clause 11, wherein the bulk lens portion has a second face, the second face being concave in shape.

Clause 13: The contact lens of clause 12, wherein the second face is configured to be in contact with the surface of an eye, when in use.

Clause 14: The contact lens of clauses 11 to 13, wherein the at least part of the first face of the membrane comprises a region adjacent the peripheral edge of the membrane.

Clause 15: The contact lens of clauses 11 to 14, wherein the first face of the membrane and the first face of the bulk lens portion define a cavity within the lens.

Clause 16: The contact lens of clauses 11 to 15, wherein the bonding interface comprises a plasma bond.

Clause 17: A method of manufacturing a contact lens, the method comprising the steps of:
   forming the membrane of clauses 1 to 10;
   forming a bulk lens portion, the bulk lens portion having a first face and a second face;
   bonding the first face of the membrane to the first face of the bulk lens portion.

Clause 18: The method of clause 17, wherein the bonding is plasma bonding.

Clause 19: The method of clause 18, wherein the step of bonding comprises plasma treating the first face of the bulk lens portion.

Clause 20: The method of clause 19, wherein the step of bonding comprises pressing the first face of the membrane to the first face of the bulk lens portion.

The invention claimed is:

1. A contact lens comprising:
   a bulk lens portion having a first face and a second face;
   a membrane having a central axis and a thickness, and comprising a first face, a second face, and a peripheral edge and
   a bonding interface between at least part of the first face of the membrane and at least part of the first face of the bulk lens portion,
   wherein
   in a cross-sectional plane passing through and parallel to the central axis of the membrane, the thickness of the membrane is at least 10 microns at a distance of 60 microns from the peripheral edge;
   the first face of the membrane and the first face of the bulk lens portion define a cavity within the lens;
   the membrane forms part of the external curvature of the contact lens; and
   the second face of the bulk lens portion is configured to be in contact with the surface of an eye, when in use.

2. The contact lens as claimed in claim 1, wherein the thickness of the membrane is at least 10 microns when measured at a distance of 50 microns from the peripheral edge.

3. The contact lens as claimed in claim 1, wherein the thickness of the membrane is at least 20 microns when measured at a distance of 60 microns from the peripheral edge.

4. The contact lens as claimed in claim 1, wherein the second face of the bulk lens portion is concave in shape.

5. The contact lens as claimed in claim 1, wherein the at least part of the first face of the membrane comprises a region adjacent the peripheral edge of the membrane.

6. The contact lens as claimed in claim 1, wherein the bonding interface comprises a plasma bond.

7. The contact lens as claimed in claim 1, wherein the membrane and/or the bulk lens portion comprise silicone elastomer.

8. A method of manufacturing a contact lens as claimed in claim 1, the method comprising the steps of:
   forming the membrane;
   forming a bulk lens portion, the bulk lens portion having a first face and a second face;
   bonding the first face of the membrane to the first face of the bulk lens portion.

9. The method as claimed in claim 8, wherein the bonding is plasma bonding.

10. The method as claimed in claim 9, wherein the step of bonding comprises plasma treating the first face of the bulk lens portion.

11. The method as claimed in claim 10, wherein the step of bonding comprises pressing the first face of the membrane to the first face of the bulk lens portion.

* * * * *